(12) United States Patent
Kerrin

(10) Patent No.: US 10,598,140 B2
(45) Date of Patent: Mar. 24, 2020

(54) FILTER AND SYSTEM FOR REMOVING EMULSIFIED WATER FROM A LIQUID

(71) Applicant: Peter Kerrin, Halifax (CA)

(72) Inventor: Peter Kerrin, Halifax (CA)

( * ) Notice: Subject to any disclaimer, the term of this patent is extended or adjusted under 35 U.S.C. 154(b) by 734 days.

(21) Appl. No.: 15/023,205

(22) PCT Filed: Sep. 19, 2014

(86) PCT No.: PCT/CA2014/050900
§ 371 (c)(1),
(2) Date: Mar. 18, 2016

(87) PCT Pub. No.: WO2015/039250
PCT Pub. Date: Mar. 26, 2015

(65) Prior Publication Data
US 2016/0237965 A1    Aug. 18, 2016

(30) Foreign Application Priority Data
Sep. 20, 2013    (CA) .................................... 2827580

(51) Int. Cl.
*F02M 37/24*    (2019.01)
*B01D 36/00*    (2006.01)
*B60K 15/03*    (2006.01)

(52) U.S. Cl.
CPC .......... *F02M 37/24* (2019.01); *B01D 36/003* (2013.01); *B60K 2015/03236* (2013.01)

(58) Field of Classification Search
None
See application file for complete search history.

(56) References Cited

U.S. PATENT DOCUMENTS

| 4,146,485 | A | * | 3/1979 | Broad | B01D 29/15 |
|           |   |   |        |       | 210/416.1 |
| 4,384,962 | A | * | 5/1983 | Harris | B01D 17/0208 |
|           |   |   |        |        | 210/788 |
| 4,497,714 | A | * | 2/1985 | Harris | B01D 17/0208 |
|           |   |   |        |        | 210/788 |
| 5,580,453 | A | * | 12/1996 | Nurse, Jr. | B01D 29/114 |
|           |   |   |         |            | 210/323.2 |
| 2016/0237965 | A1 | * | 8/2016 | Kerrin | F02M 37/221 |

* cited by examiner

*Primary Examiner* — Robert J Popovics
(74) *Attorney, Agent, or Firm* — McMillan LLP

(57) ABSTRACT

A system for increasing the efficiency of separating two liquids through filtration is disclosed. In a detailed example, water (both free and emulsified) is separated from diesel fuel, along with contaminants. The system has a filter medium attached to a support. The support has a tube structure that positions the filter medium away from the top plate. The filter can be positioned in a canister for removing emulsified water from the liquid. This canister can be used in a system to filter liquid stored in a tank that may contain water (emulsified and free) and/or debris. The system and method disclosed is particularly useful for removing emulsified water from diesel, such as ultra-low sulfur diesel (ULSD), bio-blended diesel, and diesel derivatives.

20 Claims, 3 Drawing Sheets

FILTER AND SYSTEM FOR REMOVING EMULSIFIED WATER FROM A LIQUID

FIELD OF THE INVENTION

The present invention generally relates to a filter and system for removing emulsified water from a liquid, and in particular from diesel fuel. In particular, the present invention is used to remove water as well as contaminants from diesel fuel held in storage tanks.

BACKGROUND OF THE INVENTION

Over time, fuel, such as ultra-low sulfur diesel (ULSD), bio-blended diesel and jet fuel, that is stored in tanks becomes contaminated with water and sludge. The presence of these contaminants significantly decreases the lifespan of the storage tank and the parts of the machine/engine in which the contaminated fuel comes into contact. Diesel engines often employ injection systems, spool valves and lift pumps that may be damaged by fuel contaminants and emulsified water.

In most cases, fuel filters are placed between the storage tank and the machine/engine, with the contaminated fuel being filtered while the machine/engine is running. Depending on how long the fuel has been in the storage tank, the fuel can be significantly contaminated. As such, the filter material can be quickly clogged causing the machine/engine to stop or allowing the contaminated fuel to enter the machine/engine. Therefore, filters need to be replaced frequently to avoid damage to the engine/machine. Moreover, current filters are inefficient at removing all water from the fuel before it reaches the machine/engine.

Although some protection is provided to the machine/engine using existing filter systems, the location of the filter does not prevent damage to the storage tank or the removal of contaminants from the storage tank. Excess water (free and emulsified) in the storage tank can cause premature corrosion to the tank, fuel decay and formation of microbial growth, all possibly leading to fuel leaks and formation of acetic acid (via hydrated esters). There is an unmet need for filter system capable of removing all water and contaminants from fuel in a storage tank that prevents these current issues.

Filters and systems for separating contaminants from a fluid are known in the prior art. For example, PCT Application No. WO 2008/046707 to Girondi, and US Patent Application No. 2010/0219116 to Milum teach fluid filter assemblies for the treatment of diesel/oil/fuel.

Girondi describes a fuel filter comprising a casing with an inlet for untreated fuel and an outlet for treated fuel, and internally containing a filtering wall for contaminant removal and a retaining wall holding for back water through coalescence. The retaining wall is downstream of the filtering wall according to fuel flow, and located above the filtering wall within the filter container. Girondi does not teach a system for treatment of fuel stored in a storage tank or a system operating independently of the engine/machine supplied by the storage tank. Milum also describes a fluid filter element and assembly to separate contaminants from a fluid. However, like Girondi's system, Milum's system is not for treatment of fuel in a storage tank that may operate independently of the engine/machine supplied by the storage tank.

SUMMARY OF THE INVENTION

It is the object of the present invention to provide a filter and system for removing water and contaminants from fuel in a storage tank which addresses some of the limitations of the prior art.

According to one aspect of the present invention, there is provided a support for a filter medium. The support comprises a tube, a filter mounting plate attached to one end of the tube, and a top plate mounted to the other end of the tube. The filter mounting plate is for mounting a filter medium to the support. The top plate is for positioning the support in a filter canister. In said support, a passage is formed through the tube, the filter mounting plate, and the top plate. The described support may also comprise a handle attached to the top plate.

According to another aspect of the present invention, there is provided a filter for removing emulsified water from a liquid, the filter comprising the support described above with a filter medium mounted to the filter mounting plate, wherein a passage is formed through the top plate, the tube, and the filter mounting plate of the support, with said passage terminating in the central void of the filter medium. The filter may further comprise a handle attached to the top plate.

In another aspect of the present invention, an end cap is attached to the end of the filter medium opposite the end mounted to the filter mounting plate.

The filter and system of the present invention may, in one embodiment, act on a liquid such as bio-blended diesel of varying concentrations (B2 and stronger).

According to another aspect of the present invention, a canister is provided for use in a system for removing emulsified water from a liquid. The canister may comprise a filter as described above, and a housing for said filter, the housing comprising a cylindrical body having a first end cap and a second end cap, an inlet port positioned on or near the first end cap, and an outlet port positioned on the cylindrical body near the location of the top plate of the filter when the filter is operably positioned in the housing. A handle may be attached to the top plate. In one embodiment, the liquid for treatment may be biodiesel or clean diesel.

In a further aspect of the present invention, the bottom of the canister comprises a controllable drain for removing water from the canister. The second end cap may be frustoconical in shape.

In yet another aspect of the present invention, there is provided a system for removing emulsified water from a liquid stored in a tank, the system comprising: a canister, a feeder conduit connecting a liquid storage tank to the inlet port of the canister, a return conduit connecting the outlet port of the canister to the liquid storage tank, and a pump for moving a portion of the liquid from the liquid storage tank through the canister and back into the liquid storage tank. The system may further comprise a controller for activating the pump on a predefined schedule. In one embodiment, the liquid to be treated may be ULSD, bio-blended diesel, Jet-A or other diesel derivatives.

In an additional aspect of the present invention, there is provided a method for removing emulsified water from a liquid stored in a tank, the method comprising the steps of: pumping liquid from a liquid storage tank into a canister, filtering the liquid through the filter medium in the canister to remove emulsified water and other contaminants therefrom, and returning the filtered liquid to the storage tank. The method may further comprise draining the water from the canister. In one embodiment, the liquid to be treated may be ULSD, bio-blended diesel, Jet-A or other diesel derivatives.

BRIEF DESCRIPTION OF THE DRAWINGS

These and other features, aspects and advantages of the present invention will become better understood with regard to the following description and accompanying drawings wherein:

FIG. 2 is a longitudinal cross-section of the fuel filter according to an embodiment of the present invention; and.

DESCRIPTION OF THE INVENTION

The following description is of a preferred embodiment by way of example only and without limitation to the combination of features necessary for carrying the invention into effect.

Figure 1:
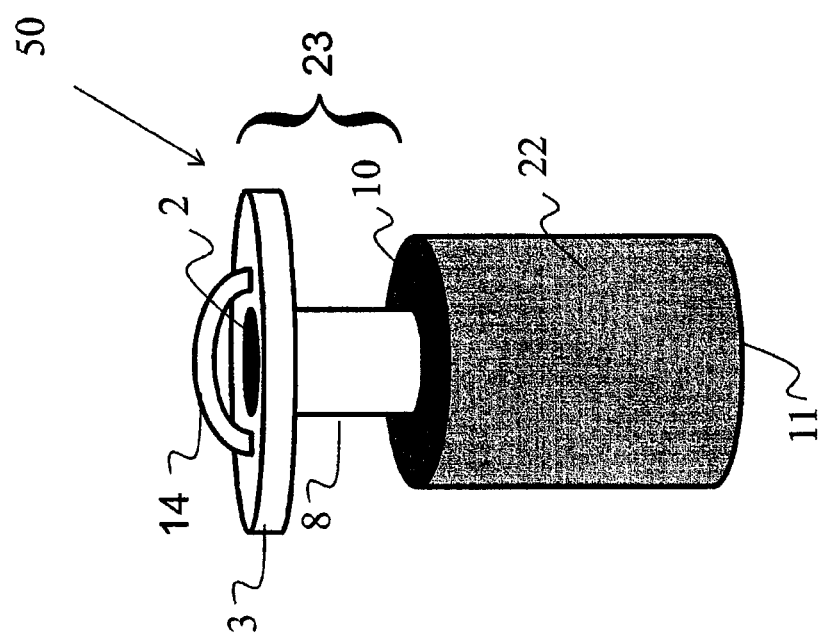
FIG. 1 is a perspective view of the filter support and filter medium according to an embodiment of the present invention.

As shown in FIG. 1, a filter assembly (50) is provided that can be inserted into a canister (described below) and added on to a liquid storage tank to remove sludge and emulsified water from the liquid housed in the tank. In one non-limiting embodiment, the liquid is a fuel, and in particular a diesel fuel derivative. Although any fuel that generates emulsified water when in storage would benefit from the present system, clean diesel fuel, which is a combination of biodiesel and a petroleum based product, and jet fuel would be particularly suited for passage through the filter described herein.

Figure 2:
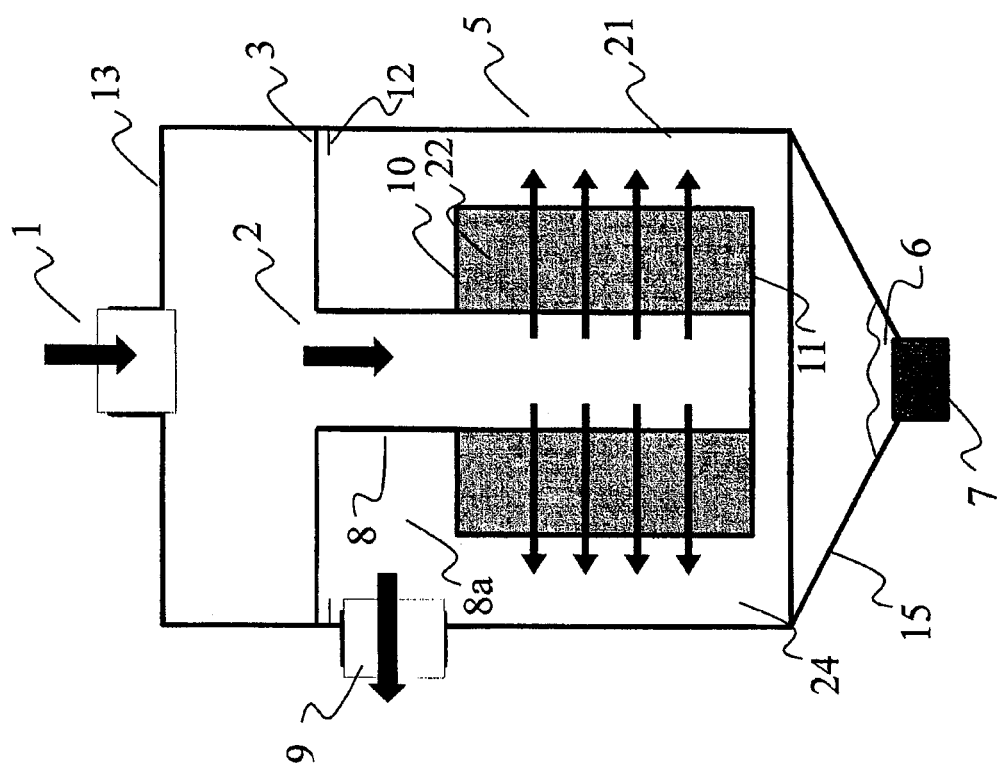

As illustrated in FIG. 2, the canister (5) for removing emulsified water and other contaminants from a fuel comprises a cylindrical body (21) having a first end cap (13) and a second end cap (15), with an inlet port (1) for untreated fuel positioned on or near the first end cap (13), and an outlet port for treated fuel (9) positioned on the cylindrical body (21). The canister may further comprise a controllable drain (7) positioned in bottom of the filter canister (15) for removing water from the canister. In one embodiment, the canister end cap (15) is frustoconical in shape.

The filter assembly (50) shown in FIG. 1, comprises at least two components: a support (23) and a filter medium (22). The support (23) is made up of a top plate (3), tube (8) and filter mounting plate (10). The top plate (3) is connected to the filter mounting plate (10) via the tube (8). The components can be provided as a single unitary structure, or each component, namely the top plate (3), tube (8) and filter mounting plate (10), may be individually connected to the other components using methods that would be common in the art. The purpose of the support (23) is to ensure proper positioning of the filter medium (22) in the canister, thus providing a space between the filter mounting plate (10) and the top plate (3). The actual volume of the space provided depends on the length of the tube (8), which can be varied depending on the size of the filter medium and/or canister and the type of fuel being filtered through the system.

In most cases, the diameter of the top plate (3) will be greater than the diameter of the filter mounting plate (10) to allow fuel to pass on the outside of the filter medium (22) when in operation. To assist in the handling of the filter assembly (50), a handle (10) can be provided on the top plate (3).

The filter mounting plate (10) is adapted to receive and retain a filter medium (22). The actual method used to attach the filter medium (22) to the filter mounting plate (10) will depend on the type of filter medium (22) used. Examples of suitable methods of attaching the two components include, but are not limited to, compression fittings, threaded fittings, use of adhesives and keyhole fittings.

The tube (8) connecting the top plate (3) to the filter mounting plate (10) can be of any shape or size, so long as a passage is provided from one end of the tube (8) to the other end of the tube (8) to allow fuel to pass through the tube (8). Although shown as a cylinder in the figures, the tube (8) does not necessarily have to be provided in this shape. Any shape that provides separation between the top plate (3) and the filter mounting plate (10) and allows the passage of fluid therethrough will suffice.

To allow fuel to flow through the system, a passage (2) is provided in the top plate (3), tube (8) and filter mounting plate (10). In some cases, the passage (2) may not be the same diameter throughout. This arrangement will allow for the flow rate of fuel through the passage (2), and ultimately the filter medium (22) to be controlled.

As mentioned above, the filter assembly (50) also comprises a filter medium (22) that is attached to the filter mounting plate (10).

The filter assembly (50) described above, is designed to be used in a canister (5) that has a housing having a cylindrical body (21) and a first (13) and second (15) end cap (FIG. 2). The filter assembly (50) is positioned in the canister (5) so that the top plate (3) engages some form of stop (12) on the inner surface of the cylindrical body (21). In some cases, this stop (12) can be a slight narrowing of the cylindrical body (21), which prevents the top plate (3) from moving any further down in the canister (5).

An inlet port (1) is positioned on or near the first end cap (13) for introducing the fuel to be filtered into the canister (5). Although, the inlet port (1) is generally positioned on the end cap (13), it is possible to move the inlet port (1) to any position on the cylindrical body (21) near the end cap (13), so long as the fuel enters the canister at a position above the top plate (3). In some embodiments, the inlet port (1) may be provided as a valve to control the flow of fuel into the canister (5).

Positioned on the cylindrical body (21) is an outlet port (9) to expelling filtered fluid from the canister (5). Typically, the outlet port (9) will be positioned just below the location where the top plate (3) rests, when the filter assembly (50) is positioned in the canister (5). This location allows for a maximum amount of emulsified water to be removed from the fuel, prior to the fuel exiting the canister (5). As with the inlet port (1), the outlet port (9) may be provided as a valve, or in conjunction with a valve, to control the flow of fuel from the canister (5).

In some cases, the second end cap (15) will be a solid plate, in which no fuel can pass. However, in a preferred embodiment, the second end cap (15) will be frustoconical in shape with a controllable drain (7) positioned at the apex. As with the inlet and outlet ports (1, 9), the controllable drain (7) may be in the form of a valve or positioned in conjunction with a valve. Since the emulsified water (6) tends to settle at the bottom of the canister (5), the inclusion of a controllable drain (7) allows for the emulsified water (6) to be removed from the canister (5) whenever is convenient. Otherwise, the filter assembly (50) needs to be removed from the canister (5) and the collected emulsified water (6) siphoned off at regular intervals.

Figure 3:
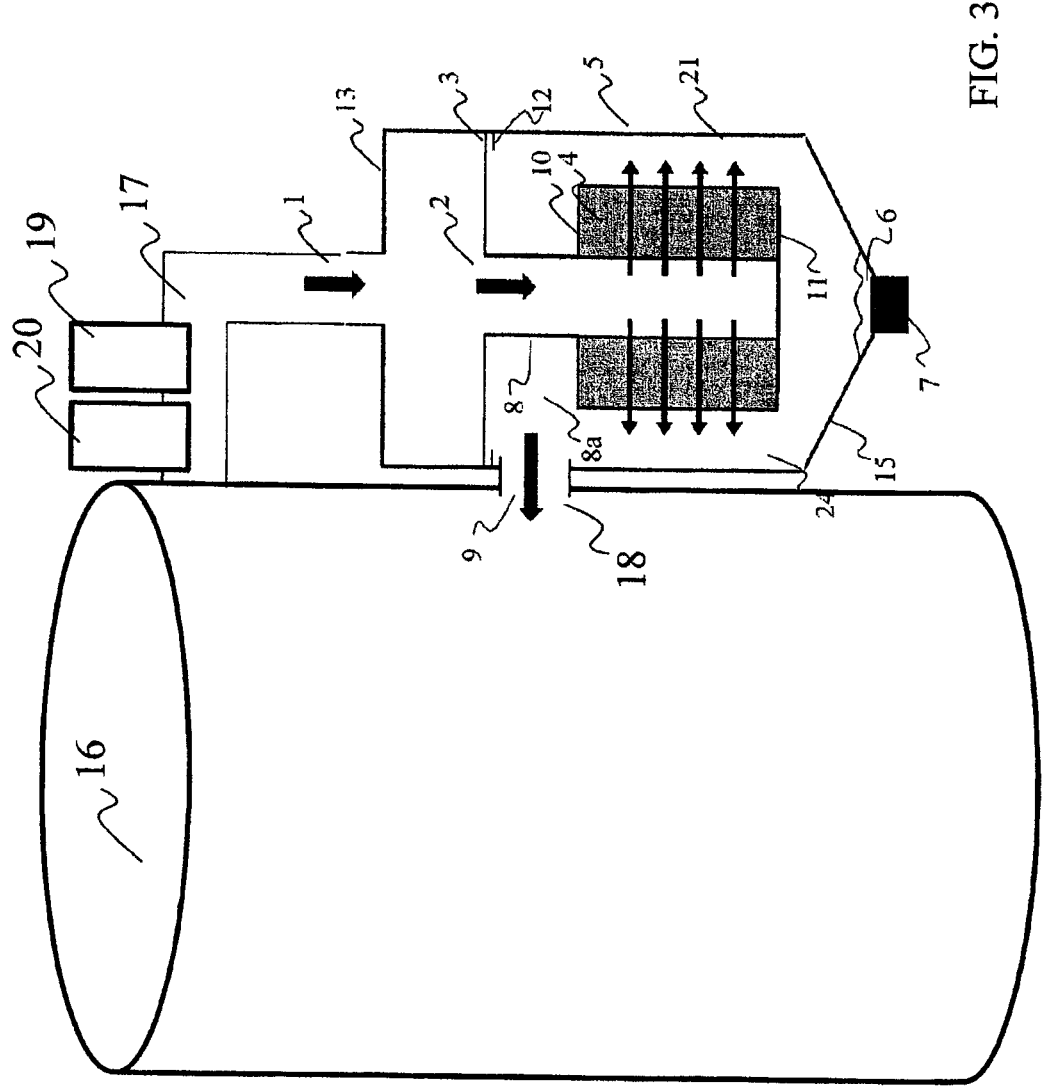
FIG. 3 is a representation of a system for the removal of water and other contaminants from fuel in a storage tank according to an embodiment of the present invention.

The canister (5), including the filter assembly (50), can be part of a system for removing emulsified water and other particulate matter from fuel stored in a storage tank (16) (FIG. 3). In this case, the canister (5) is positioned outside the storage tank (16) and the two units are connected by a feeder conduit (17) and a return conduit (18) to form a circuit. In operation, a portion of the fuel stored in the storage tank (16) is transitioned to the canister (5) via the feeder conduit (17). Although gravity may be enough to start the flow of fuel through the feeder conduit (17), a pump (19)

or series of pumps, may be used to move the fuel through the system. In the embodiment shown in FIG. 3, the pump (19) is placed inline with the feeder conduit (17). However, it is possible to position the pump at various spots in the system, including the storage tank (16) and the return conduit (18).

The overall efficiency and usability of the system can be improved by including a controller (20). The controller (20) can be used to automatically activate such things as the pump (19) and the controllable drain (7). Moreover, the controller (20) can be programmed to run on a set schedule to allow for regular filtering of the fuel stored in the tank (16). An analyser (not shown) can also be positioned in the system to monitor the quality and consistency of the fuel moving through the system. This data permits early detection of filter failure or the need for replacement.

Valves (not shown) can be placed at various locations along the system to control the flow of fuel through the system. These valves allow for maintenance to be conducted on certain sections of the system, without having to remove all of the fuel from the system prior to the work commencing. Moreover, if the controller fails to operate on the set schedule, the valves can be manually opened to allow the system function.

In operation, fuel moves from the storage tank (16) through the feeder conduit (17) into the canister (5) through inlet port (1). The fuel congregates in the canister in the space formed between the top plate (3) and the first end cap (13). Gradually, the fuel moves through the passage (2) into the central void of the filter medium (22). The fuel then percolates through the filter medium (22) and into the canister (5). To ensure that the fuel passes through the filter medium (22) and not straight out the bottom of the filter medium (22), an end cap (11) is attached to the filter medium (22) opposite the end that is attached to the filter mounting plate (10).

The emulsified water trapped by the filter medium (22) falls to the bottom of the canister (5) and rests against the end plate (15). The debris in the fuel is trapped in the filter medium (22).

The filtered fuel (24) rises up towards the top plate (3) for removal from the canister (5) through the outlet port (9). The filtered fuel (24) is then returned to the storage tank (16) via return conduit (18).

As the filtered fuel (24) rises towards the top plate (3) it encounters a region of expanded volume (8a) prior to reaching the outlet port (9). The region of expanded volume (8a) is formed as a result of the differing space occupied by the filter medium (22) and the tube (8) of the support for the filter (23) within the canister (5). The tube (8) forms a neck region between the top plate (3) and the filter mounting plate (10), which creates an expanded volume in the upper portion of the filtered fuel chamber. The rise of the fuel within the filtered fuel (24) chamber (24) towards the outlet port (9) will be slowed upon entering the region of expanded volume (8a). This reduction in fuel flow has a beneficial effect on water removal. Reduction in the rate of fuel flow in the expanded volume region (8a) causes an enhancement in the shedding of residual emulsified water in the treated fuel through coalescence. The removed water falls to the bottom of the canister (5), where it is collected on the end plate (15) of the canister (5). Collected emulsified water (6) may be drained through the controllable drain (7). In FIG. 3, the solid arrows indicate the flow of fuel through the system.

This region of expanded volume 8(a) created by the narrowing of the tube (8) into a neck leads to a sudden decrease in pressure of the fuel prior to exiting the canister. This decrease in pressure slows down the flow rate of the fuel and permits any remnants or lingering heavier elements (typically water) to drop out of the fuel stream and remain in the container. Thus, the efficiency of the filter assembly is enhanced, and the effect of a high flow rate in potentially decreasing the efficacy of the filter is mitigated.

In another preferred embodiment, the canister (5) and/or the inlet port (1) are positioned such that the inlet port (1) is located at an inner base surface of the storage tank (15), and preferably as close to flush with the inner base surface as reasonably possible. By positioning the inlet port (1) in this manner, any sedimentary particles, sludge, microbial growth and standing water that has accumulated at the base of the tank (15) can be brought into the canister and filter assembly and withdrawn from the drain. This altogether prevents or limits having to clean the interior of the tank 15.

Various modifications and substitutions may be made to the invention as herein described without departing from the scope of the invention, which is limited only by the claims that now follow.

The invention claimed is:

1. A filter system for removing emulsified water from a liquid, the filter system comprising:
   a filter assembly comprising:
      a support comprising: a tube; a filter mounting plate attached to one end of the tube; and a top plate connected to the other end of the tube having a passage to the interior of the tube; and
      a filter medium mounted to the filter mounting plate of the support; and
   a canister, comprising:
      a cylindrical body;
      a first and second end cap on either end of the cylindrical body;
      a stop located proximate to the first end cap and engaging the top plate;
      an inlet port positioned above the stop; and
      an outlet port positioned on the cylindrical body between the stop and the filter mounting plate when the top plate has engaged the stop;
   wherein the tube provides a separation between the filter mounting plate and the top plate within the canister; and
   wherein a mixture of the emulsified water and the liquid enters through the inlet port and flows through the passage permitting flow of the mixture into the tube and exiting into the filter medium; following passage through the filter medium, the liquid flows upward through the outlet port.

2. The filter system according to claim 1, wherein the filter assembly further comprises an end plate attached to the end of the filter medium opposite the end mounted to the filter mounting plate.

3. The filter system according to claim 1, wherein the filter assembly further comprises a handle attached to the top plate.

4. The filter system according to claim 1, wherein the diameter of the top plate is greater than the diameter of the filter mounting plate.

5. The filter system according to claim 1, wherein the outlet port is adjacent the stop.

6. The filter system according to claim 1, the inlet port further comprising a valve.

7. The filter system according to claim 1, the outlet port further comprising a valve.

8. The filter system according to claim 1, further comprising an analyser monitoring the quality of the liquid.

9. The filter system according to claim 1, wherein the second end cap of the cylindrical body further comprises a controllable drain for removing water from the canister.

10. The filter system according to claim 1, wherein the second end cap of the cylindrical body is frustoconical in shape.

11. The filter system according to claim 1, wherein the liquid is a diesel or bio-diesel derivative.

12. The filter system according to claim 1, wherein the tube comprises a narrowed neck portion at an entrance of said filter assembly.

13. The filter system according to claim 12, wherein the narrowed neck portion provides a region of expanded volume proximate said outlet port to thereby reduce the velocity of the fuel to thereby permit excess water still present in the liquid to fall towards a bottom of the filter assembly.

14. The filter system according to claim 12, wherein said inlet port is positioned at an inner base of the tank to thereby receive elements settled at a base of the tank into said filter assembly.

15. The filter system according to claim 1, used for removing emulsified water from a liquid stored in a liquid storage tank, the filter system further comprising:
a feeder conduit connecting the liquid storage tank to the inlet port of the canister;
a return conduit connecting the outlet port of the canister to the liquid storage tank; and
a pump for moving a portion of the liquid from the liquid storage tank through the canister and back into the liquid storage tank.

16. The filter system according to claim 15, further comprising a controller for activating the pump on a predefined schedule.

17. The filter system according to claim 15, wherein the liquid is biodiesel.

18. A method for removing emulsified water from a liquid stored in a liquid storage tank, the method comprising the steps of:
pumping the liquid from the liquid storage tank into the canister of the filter system defined in claim 15;
filtering the liquid through the filter medium in the canister to remove the emulsified water therefrom; and
returning the filtered liquid to the storage tank.

19. The method according to claim 18, further comprising draining the water from the canister.

20. The method according to claim 18, wherein the liquid is biodiesel.

* * * * *